March 31, 1942.    B. A. TETZLAFF    2,278,337

CLAMP

Original Filed June 1, 1940

Inventor
Benjamin A. Tetzlaff
by Frank J. Schraeder Jr.
Attorney.

Patented Mar. 31, 1942

2,278,337

UNITED STATES PATENT OFFICE 2,278,337

CLAMP

Benjamin A. Tetzlaff, Riverside, Ill.

Original application June 1, 1940, Serial No. 338,351. Divided and this application June 28, 1941, Serial No. 400,228

9 Claims. (Cl. 24—19)

This invention relates to clamps adapted for telescopically securing a flexible or semi-flexible tubular connection, as for example, a hose, to a tubular connection, such as a pipe or any other tubular fluid inlet or outlet connection.

This application is a divisional application directed to the clamp per se disclosed in my co-pending application Serial Number 338,351, filed June 1, 1940.

Clamps of a character similar to that disclosed herein, including a flexible band trained through spaced parts of an arcuate bridge and adjustably associated with a nut supported on a tightening screw, have been heretofore made by me and used extensively in many applications where flexible tubular members were connected to pipes, conduit, and other tubular connections, and while these former constructions have proven satisfactory in practically most instances, the herein disclosed improvements embody certain novel features and advantages not found in these former constructions whereby a clamp of simple construction and comparatively greater efficiency is attained, and which is adaptable for securely holding unusually high-pressure hose connections.

Among the novel objects and distinctive features of my invention are the following:

(a) Simplified construction of parts.

(b) Provision of a clamp wherein the ends of the flexible clamp band are fixed by the nut, as by welding, to prevent movement relatively to the nut which is supported on the tightening screw.

(c) The floating bridge is not connected to, or adapted to embrace, the oppositely disposed flat faces of the clamp band; that is, the bridge is adapted for free movement unrestricted by any engagement with the clamp band, hence, this clamp of the flexible band type may be especially used on high-pressure hose connections.

In former clamps of this type, the bridge element was provided at its end with bent portions arranged to overlap and embrace the opposite flat faces of the clamp band, so that in the tightening operation of the clamp, the embraced band portions, which were slidably supported in the overlapped bridge ends, would move through such bridge ends. This construction caused the clamp band to be bent angularly at such overlapped bridge ends and imposed a frictional resistance between the band and the bridge ends.

The elimination of this frictional resistance not only affords the utilization of the full energy exerted by the tightening screw in clamping operation, but in precision clamping operations the clamping pressure of the clamp may be measured, as by the use of a torque-indicating wrench, so that uniform and predetermined clamp pressures may be imposed upon the clamp-connected member or members.

(d) In clamps which are subjected to repeated detachment and attachment, the band portions, which are bent and subjected to repeated bending, very often fracture at such bent portions. This disadvantage is overcome by my present floating bridge and band construction and arrangement whereby all bends in the band, at points which might be subjected to repeated bending, are obviated, thus permitting the use of stainless steel, or other special alloy, bands which tend to fracture in bending.

(e) The length of the cord of the arcuate bridge base, when in tightened or clamped position, is 'ess than the clamped diameter of the band, and its ends preferably do not extend beyond the points of tangency or the points of mergence of the straight portions of the band with the circular intermediate portion of the band.

(f) The end portions of the band are bent horizontally to lie in relatively overlapping position on top of the nut, and the bends in these end portions occur in spaced parallel planes which are substantially coincident with a pair of opposite sides of the nut. The terminus of the band end horizontal portion, which is disposed between the other horizontal band end portion and the nut, does not extend outwardly beyond the edge of the nut which is adjacent and parallel to such terminus, but preferably slightly inwardly of such edge. This feature affords bilateral symmetry in the arrangement of the relatively oppositely angularly disposed side band portions and insures retainment of the longitudinal center line of the screw coincident with the vertical axis of the clamp.

(g) The rotatable screw is provided with a bearing at its point of support on the bridge, which bearing is of comparatively hard metal, such as steel or bronze, to provide a wear-resistant flat surface for the flat annular surface of the screw and since the screw is preferably made of comparatively soft metal to permit it to be readily peened at its end against displacement from the bridge. This bearing may be made in the form of a flat perforated washer loosely supported or press-fitted to the screw end, or it may be welded to the bridge.

With the above and other objects in view, my invention consists in the novel combination, construction and arrangement of the parts and members shown in preferred embodiments in the attached drawing, described in the following specification, and particularly pointed out in the appended claims:

Referring to the drawing.

Figure 1:
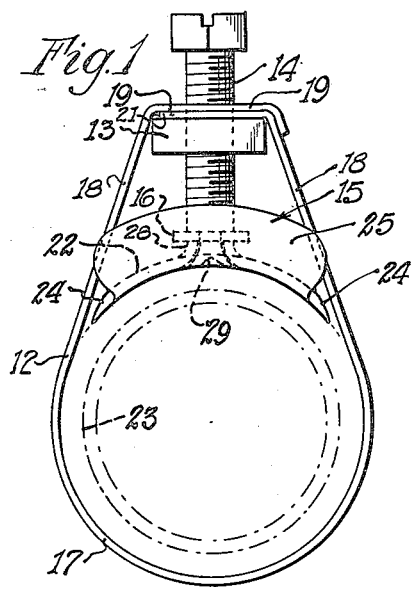
Fig. 1 is an end view of a clamp embodying my invention.
Figure 2:
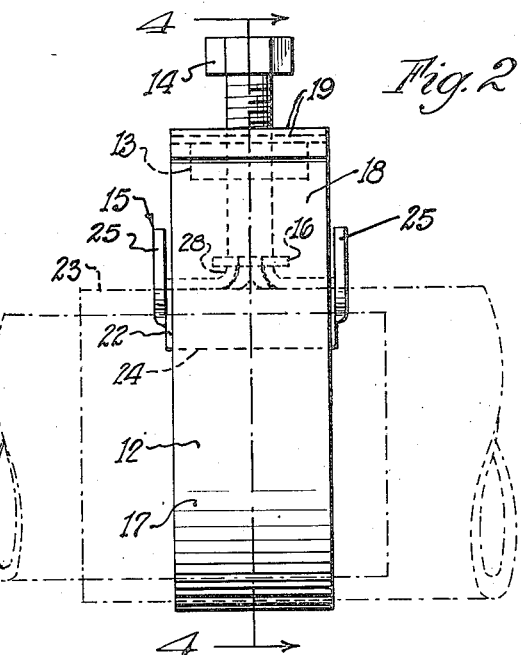
Fig. 2 is a side elevation of the clamp shown in Fig. 1.
Figure 3:
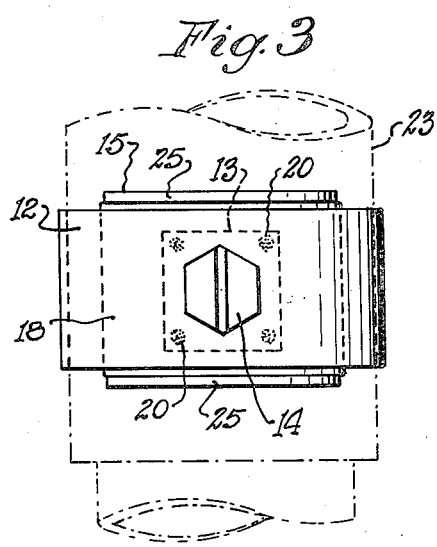
Fig. 3 is a plan view of the clamp.

The clamp as shown in Figs. 1 to 4, inclusive, consists of a single band 12 of flexible metal, a nut 13 in threaded engagement with a screw 14, a bridge 15, and a bearing 16 for the end of the screw 14.

As shown in the illustrations, the clamp band 12 includes a substantially semi-circular medial portion 17 and substantially straight end portions 18 disposed angularly upwardly to converge toward the nut 13, and terminating in relatively oppositely bent horizontally disposed termini 19, preferably disposed in overlapping position on top of the nut 13. The terminal portions 19 are spot-welded to the nut, as indicated by 20 in Fig. 3.

The ends of termini 19 of the band could be shortened so as to abut on a lateral center-line of the nut 13, but I prefer to overlap such end portions, and to perforate same for the screw 14, so that the screw extends through the band ends 19 and thereby provides an additional safety factor in the event the welds 20 were severed by any undue tension exerted on the band 12.

Figure 4:
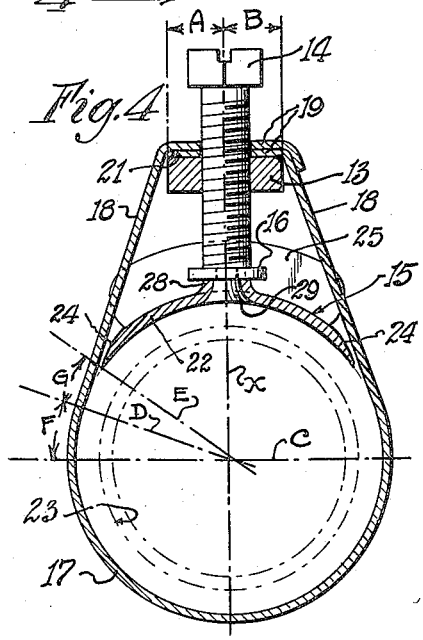
Fig. 4 is an enlarged vertical section of the clamp.

In order to provide bilateral symmetry in design for the purpose of maintaining the longitudinal axis of the screw in perpendicular position relatively to the horizontal axis of the clamp, particularly during tightening of the screw 14, the bends in the band at the terminal portions 19 occur in parallel vertical planes which are spaced substantially equidistant from the centerline or longitudinal axis of the tightening screw 14. These planes, in which these curved bends are disposed, extend just at or slightly beyond opposite sides of the nut 13. In the overlapping band end construction, one end 21, of the band end which is disposed between the nut 13 and the other or upper band end, is shortened to extend inwardly of the top side edge of the nut 13, as shown in Figs. 1 and 4, and the opposite corner edges of the upper face of the nut 13 may be slightly rounded to facilitate such equidistant bend arrangement and substantially bilateral symmetrical disposition of the upwardly converging band portions 18 relatively to the longitudinal and perpendicular axis of the screw 14.

The bridge 15, which is constructed of a substantial metallic stamping or casting, functions, when the clamp is tightened, to bridge or span substantially the full gap between the clamp-engaging circular band portion. The base portion 22 of the bridge is curved to conform to substantially the curve of the surface of the clamped member 23. The length of the arcuate bridge base portion 22 is such that its ends preferably do not extend beyond the points of tangency at the mergence of the band medial portion 17 with the end portions 18 to avoid forcing or crowding of the bridge ends in between the clamp band and the member being clamped and possibly thereby indenting the clamped member if made of comparatively soft material.

Although this type of clamp is preferably designed to fit a specific or predetermined clamped diameter of the member to be clamped, it may be applied to a member which may be of a slightly smaller diameter, in which case, or in the event of any unusual excessive tightening of the clamp, the bridge ends may be brought into engagement with the band end portions 18; hence, the bridge base end portions 24 are thinned outwardly, as by swedging, to increase their flexibility and facilitate their forceful interposition between the clamped member and the band 12.

To stiffen the bridge 15, the base portion 22 is formed integrally with spaced arcuate side walls 25 which also function to properly guide the bridge in its tightening movement since the outer end portions of these sides embrace the side edges of the clamp band portions 18.

Figure 5:
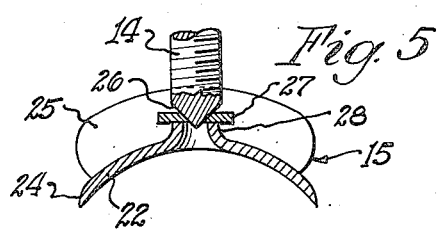
Fig. 5 is a partial vertical section showing a modified support for a pointed end screw in engagement with a bearing washer on a freely floating bridge.

While the bridge 15 may be entirely free or floating, as indicated in Fig. 5, wherein the conical end 26 of the screw 14 is positioned within the central perforation of the annular bearing 27, I prefer to provide a loose connection between the screw 14 and the bridge 15, as shown in Fig. 4, so as to prevent accidental loss or displacement of the bridge.

The bridge base 22 is provided with a diametrically outwardly upset perforated centrally disposed annular support 28, formed preferably with a flat annular face for support thereon of a suitable bearing 27, of steel or bronze, which is adapted to support thereon the flat annular face of the screw end.

The end of the screw 14 is preferably provided with an extension 29 of decreased diameter which extends through the perforation of the bearing 27 into the perforation of the upset support 28 wherein its terminus is peened to loosely interlock the screw with the bridge 15; the screw being freely rotatable in the support 28.

The annular disk-like bearing 27 may be loosely mounted about the screw extension 29, or press-fitted tightly thereon. The bearing 27 may also be welded to the upset bridge support 28.

My preferred design of a clamp of the type herein disclosed, when in clamped position, is based upon the following formulae:

X = longitudinal axis of tightening screw or vertical axis of clamp.
C = horizontal axis of clamp.
A = distance from the vertical axis of the clamp to the center of radius of arcuate bend in one end of the band.
B = distance from the vertical axis of the clamp to the center of radius of arcuate bend in the other end of the band.
D = line intersecting tangent point and center of clamp.
E = line intersecting center of clamp and end of bridge.

*Formulae*

The length of the arc G is substantially equal to or slightly less than that of the arc F. The distance A is equal to the distance B.

I claim:

1. A clamp including a nut, a single band of flexible metal having a substantially semi-circular medial portion and substantially straight integral end portions disposed tangentially to said medial portion and angularly one to the other in an outwardly converging direction; said end portions of the band having ends bent angularly in relatively opposite directions and disposed in relatively fixed position against one face of said nut, a tightening screw having threaded engagement with said nut, and an arcuate bridge operatively associated with said screw during the tightening of said band, said br'dge including an arcuate base portion and radially outwardly disposed side walls formed integrally with said base portion, the ends of said bridge base extending closely to the points of tangency of said straight band portions with said band medial portion, and the radius of the bridge base being substantially equal to the radius of said medial portion of the band.

2. The structure of claim 1, and including said bridge side walls extending slightly beyond the side edges of said straight portions of the band to guide the bridge in its clamping movement toward the member to be clamped but permitting free movement of said band relatively to said bridge.

3. The structure of claim 1, and including said bridge side walls extending slightly beyond the side edges of said straight portions of the band to guide the bridge in its clamping movement toward the member to be clamped but permitting free movement of said band relatively to said bridge, and the arcuate length of said bridge base being longer than the arcuate length of said bridge side walls.

4. The structure of claim 1, and including said bridge base having a central outwardly upset portion, and an annular bearing for the end of the screw positioned on said bridge base upset portion.

5. The structure of claim 1, and including said bridge base having a central outwardly upset portion, and an annular bearing for the end of the screw welded to said bridge base upset portion.

6. The structure of claim 1, and including the bends between said band end portions and said straight portions of the band disposed substantially in spaced parallel planes which planes are parallel to and equidistant from the longitudinal axis of said screw.

7. The structure of claim 1, and including said straight portions of the band having oppositely bent portions arranged in overlapping position over, and secured to, the one face of said nut, and said overlapping ends having aligned perforations through which said screw extends into threaded engagement with said nut.

8. The structure of claim 1, and including said straight portions of said band each having an arcuate bend whereby the end portions of the band are arranged in overlapping position on the upper face of said nut, said bent ends being welded to said nut and provided with aligned perforations through which said screw extends into threaded engagement with said nut, and the centers of the radii of said arcuate bends being substantially equidistant from the longitudinal axis of said screw.

9. A clamp including a nut, a band of flexible metal having a substantially semi-circular medial portion and substantially straight integral end portions disposed tangentially to said medial portion, said end portions of the band having ends bent angularly in relatively opposite directions and disposed in relatively fixed position against one face of said nut, a tightening screw having threaded engagement with said nut, and an arcuate bridge operatively associated with said screw during the tightening of said band, said bridge including an arcuate base portion and radially outwardly disposed side walls formed integrally with said base portion, the ends of said bridge base extending closely to the points of tangency of said straight band portions with said band medial portion.

BENJAMIN A. TETZLAFF.

DISCLAIMER 2,278,337.—*Benjamin A. Tetzlaff*, Riverside, Ill. CLAMP. Patent dated March 31, 1942. Disclaimer filed December 14, 1944, by the inventor.

Hereby enters this disclaimer:

(a) to the portion of the specification in the following words:

"The floating bridge is not connected to, or adapted to embrace, the oppositely disposed flat faces of the clamp band; that is, the bridge is adapted for free movement unrestricted by any engagement with the clamp band, hence, this clamp of the flexible band type may be especially used on high-pressure hose connections.

"In former clamps of this type, the bridge element was provided at its end with bent portions arranged to overlap and embrace the opposite flat faces of the clamp band, so that in the tightening operation of the clamp, the embraced band portions, which were slidably supported in the overlapped bridge ends, would move through such bridge ends. This construction caused the clamp band to be bent angularly at such overlapped bridge ends and imposed a frictional resistance between the band and the bridge ends.

"The elimination of this frictional resistance not only affords the utilization of the full energy exerted by the tightening screw in clamping operation, but in precision clamping operations the clamping pressure of the clamp may be measured, as by the use of a torque-indicating wrench, so that uniform and predetermined clamp pressures may be imposed upon the clamp-connected member or members.

"In clamps which are subjected to repeated detachment and attachment, the band portions, which are bent and subjected to repeated bending, very often fracture at such bent portions. This disadvantage is overcome by my present floating bridge and band construction and arrangement whereby all bends in the band, at points which might be subjected to repeated bending, are obviated, thus permitting the use of stainless steel, or other special alloy, bands which tend to fracture in bending.

"The length of the cord of the arcuate bridge base, when in tightened or clamped position, is less than the clamped diameter of the band, and its ends preferably do not extend beyond the points of tangency or the points of mergence of the straight portions of the band with the circular intermediate portion of the band."

(b) to the subject matter of claim 1 per se of said patent but not disclaiming the subject matter of claim 1 in conjunction with the subject matter set forth in claims 3, 4, 5, 6, and 8 of said patent.

(c) to the subject matter of claims 2, 7, and 9 of said patent.

[*Official Gazette January 16, 1945.*]